(12) United States Patent
McClure

(10) Patent No.: US 7,955,478 B2
(45) Date of Patent: Jun. 7, 2011

(54) SOLAR DISTILLATION DEVICE

(76) Inventor: Miles McClure, Sandy, OR (US)

( * ) Notice: Subject to any disclaimer, the term of this patent is extended or adjusted under 35 U.S.C. 154(b) by 1102 days.

(21) Appl. No.: 11/674,963

(22) Filed: Feb. 14, 2007

(65) Prior Publication Data

US 2008/0190755 A1 Aug. 14, 2008

(51) Int. Cl.
*B01D 1/06* (2006.01)
*B01D 3/04* (2006.01)
*C02F 1/14* (2006.01)

(52) U.S. Cl. ........ 203/10; 159/27.1; 159/27.3; 159/47.1; 159/903; 159/46; 202/176; 202/187; 202/234; 202/237; 203/22; 203/23; 203/100; 203/DIG. 1; 203/DIG. 8

(58) Field of Classification Search .................. 159/27.1, 159/27.3, 46, 47.1, 903, DIG. 42; 165/48.2; 202/176, 187, 234, 237; 203/10, 22, 23, 203/24, 100, DIG. 1, DIG. 8
See application file for complete search history.

(56) References Cited

U.S. PATENT DOCUMENTS

| | | | |
|---|---|---|---|
| 102,633 A | 5/1870 | Wheeler et al. | |
| 983,424 A | 2/1911 | Brosius | |
| 2,133,649 A | 10/1938 | Abbot | |
| 2,141,330 A | 12/1938 | Abbot | |
| 2,636,129 A | 4/1953 | Agnew | |
| 3,190,817 A * | 6/1965 | Lustenader et al. | 202/236 |
| 3,265,115 A * | 8/1966 | Charles | 159/13.4 |
| 3,671,404 A | 6/1972 | Meckler | |
| 3,713,560 A * | 1/1973 | Slysh et al. | 137/343 |
| 4,010,080 A | 3/1977 | Tsay et al. | |
| 4,025,398 A | 5/1977 | Haselden | |
| 4,135,985 A | 1/1979 | La Rocca | |
| 4,219,387 A * | 8/1980 | Gruntman | 202/182 |
| 4,230,531 A | 10/1980 | Fernandopulle | |
| 4,235,678 A | 11/1980 | McKeen | |
| 4,278,076 A * | 7/1981 | Hopper | 126/704 |
| 4,312,709 A | 1/1982 | Stark et al. | |
| 4,373,996 A | 2/1983 | Maruko | |

(Continued)

FOREIGN PATENT DOCUMENTS

CA 2036979 2/1991

(Continued)

OTHER PUBLICATIONS

International Search Report published Dec. 23, 2009, PCT/US08/52435.

(Continued)

*Primary Examiner* — Virginia Manoharan
(74) *Attorney, Agent, or Firm* — Seth D. Levy; Davis Wright Tremaine LLP

(57) ABSTRACT

A solar distillation apparatus utilizing a substantially vertical reactor assembly is disclosed. The reactor includes a tubular outer shell, a base, a cap, and a central tension member. The annular space between the outer tube and the central tension member forms the reactor chamber. Seawater or other feed liquid enters the reactor chamber through the base plate. Reflected or direct solar energy heats the feed liquid, generating low pressure vapor. The vapor exits the reactor through the cap structure or the base. The concentrate left behind settles by gravity to the bottom region of the reactor's liquid column. Extension tubes on the feed openings allow feed liquid to enter the liquid column above the concentrate layer and avoid excessive mixing of the feed liquid and the concentrate. The concentrate exits the reactor through one or more openings in the base.

6 Claims, 9 Drawing Sheets

U.S. PATENT DOCUMENTS

| | | | |
|---|---|---|---|
| 4,377,441 A | 3/1983 | Kimmell et al. | |
| 4,455,374 A | 6/1984 | Schwartz | |
| 4,756,802 A | 7/1988 | Finney | |
| 4,921,580 A | 5/1990 | Martes et al. | |
| 5,191,876 A | 3/1993 | Atchley | |
| 5,505,917 A | 4/1996 | Collier | |
| 5,971,061 A * | 10/1999 | Li | 165/94 |
| 6,001,222 A | 12/1999 | Klein | |
| 6,582,563 B1 * | 6/2003 | Adam et al. | 202/83 |
| 6,656,326 B2 | 12/2003 | Nagler | |
| 6,767,433 B2 | 7/2004 | Foster et al. | |
| 2006/0102007 A1 * | 5/2006 | Martin | 99/275 |
| 2007/0029067 A1 * | 2/2007 | Kidwell et al. | 165/45 |

FOREIGN PATENT DOCUMENTS

| | | |
|---|---|---|
| WO | 2008100706 | 8/2008 |

OTHER PUBLICATIONS

Written Opinion mailed Jun. 1, 2009, PCT/US08/52435.

* cited by examiner

SOLAR DISTILLATION DEVICE

BACKGROUND

1. Field of the Invention

This invention relates generally to the field of solar energy and systems, particularly to distillation of liquids by utilizing solar radiation.

2. Discussion of Prior Art

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

As the cost of fossil fuels increases and the scarcity of potable water becomes more acute, the need for alternative methods of freshwater production becomes greater each year. In fact, much of the developing world's population lives where potable water is extremely rare. Therefore, an easily manufactured, simply operated means for producing fresh water from brackish water would be a critical step in providing the basic necessities of life for literally millions of people. Solar distillation is perhaps the most basic method for generating potable water from seawater or brackish water, and simple solar distillation systems have been in use in one form or another for hundreds of years.

Several issued U.S. patents specifically relate to machines that use the sun's energy to evaporate seawater in a closed reactor. The steam vapor generated rises above the water surface and condenses on the inside cover of the reactor. The distillate collected is suitable as potable water. Examples of "solar stills" can be found in U.S. Pat. No. 6,767,433 (Foster et al. 2004), U.S. Pat. No. 6,001,222 (Klein 1999), U.S. Pat. No. 4,235,678 (McKeen 1980), and U.S. Pat. No. 4,135,985 (LaRocca 1979). These devices, ranging in size from personal fresh water generators to building-sized units, generally involve an insulated box, a pan or pool of water, and a transparent top that allows light to enter but traps heat and vapor.

Numerous improvements have been developed to increase the efficiency of such devices, including lowering the air pressure above the water surface (thereby lowering the amount of heat required for generating vapor), using forced or induced ventilation to increase evaporation rates, using cover "shakers" to help condensed water migrate down the cover to the collection trough, and separating the evaporation chamber from the condensation chamber to increase thermal efficiency. Floating units have been patented that utilize the ocean or lake as a heat sink for the condenser, see, for example, U.S. Pat. No. 6,656,326 (Nagler 2003). Because these devices rely on direct solar heating, their effectiveness is limited by the size of the device.

Another broad class of inventions utilizes inclined or horizontal tubes for the evaporation chamber. The tubes are located at the focal point or focal line of a reflector, or in some cases, they are located at the focal point of a Fresnel lens. Examples of these devices can be found in U.S. Pat. No. 5,505,917 (Collier 1996), U.S. Pat. No. 5,191,876 (Atchley 1993), and U.S. Pat. No. 4,312,709 (Stark et al. 1982). U.S. Pat. No. 2,141,330 (Abbot 1938) shows an early solar distilling apparatus that uses a clockwork mechanism to track the sun's path through the sky. In this and similar devices, the fluid is heated as it travels through the tubing, similar to a conventional boiler. The steam generated can be used for work, heat transfer, heat storage, or, if conveyed to a condenser, the steam can be returned to liquid distillate. Unfortunately, these devices are susceptible to mineral (scale) buildup in the evaporation tubes. This can be partially overcome by the use of a closed heating circuit with an engineered working fluid, but this solution adds another level of complexity and additional heat transfer loss between loops.

Vertical arrangements for solar evaporators are less numerous. One arrangement is shown as part of a larger system in U.S. Pat. No. 4,373,996 (Maruko 1983). Vertical distillation towers for alcohol have been patented, e.g. U.S. Pat. No. 4,377,441 (Kimmell 1983), U.S. Pat. No. 4,455,374 (Schwarz 1984), and U.S. Pat. No. 102,633 (Wheeler et al. 1870). The '441 patent shows a solar distilling apparatus with a vertical reactor and automated fill and relief valves. The design shows a parabolic reflector arranged to focus sunlight onto the bulbous "boiler" section of the reactor. This design shows one advantage of a vertical reactor arrangement, that of compact size, but it also shows the difficulty in supporting the reactor column at sizes larger than desktop units. In addition, the device uses complex valves to maintain suitable fluid levels and temperatures within the boiler and distilling tower.

Providing a cost-effective and workable method to separate the raw feed liquid from the concentrated liquid left behind after the vapor has been driven off is a problem common to all previous designs. Batch mode operation is one method, but that solution eliminates continuous production and potentially wastes part of the daily sun cycle.

Therefore, there is a need in the art for a simple, cost-effective and easily manufactured device that can be employed to desalinate, purify, or distill water or other liquids.

SUMMARY

The following embodiments and aspects thereof are described and illustrated in conjunction with apparatuses and methods which are meant to be exemplary and illustrative, not limiting in scope.

The present invention includes a machine, apparatuses, and methods for evaporating liquid to create distillate and concentrate utilizing solar radiation.

Various embodiments provide for a machine comprising a substantially vertical, tubular evaporation reactor adapted to provide a liquid concentrate region below a feed liquid region, a base located at a lower end of said evaporation reactor, a cap structure located at an upper end of said evaporation reactor, a means for feed liquid to enter said feed liquid region within said evaporation reactor, a means for liquid concentrate to exit said evaporation reactor from said liquid concentrate region, a means for vapor to exit said evaporation reactor, and at least one tension member that connects said base to said cap structure and which is adapted to compress said evaporation reactor between said base and said cap structure, thereby creating substantially watertight seals between said base, said evaporation reactor, and said cap structure.

The machine may further include at least one solar reflector device located in relation to said evaporation reactor so as to direct reflected solar radiation to a point or line coincident with said evaporation reactor.

In another embodiment, said evaporation reactor may comprise an outer tube and an inner tube of smaller outside dimension relative to said outer tube located concentrically within said outer tube, whereby said outer tube and said inner tube form a longitudinal annulus adapted for a feed liquid to react with solar radiation. Said outer tube may be substantially transparent, and may further include small diameter wire embedded within and/or affixed to the surface of said outer tube. Said inner tube and/or said outer tube may be tinted blue-green to resemble the color of water in the ocean.

In another embodiment, said tension member may comprise at least one rod, affixed to and extending from said base to said cap structure, said rod affixed to said cap structure, said rod adapted to be put in tension whereby said evaporation reactor is in compression.

In another embodiment, said tension member may comprise at least one flexible, elastic member secured to said base and to said cap structure, said elastic member adapted to act in tension to compress said evaporation reactor between said base and said cap structure.

In another embodiment, said evaporation reactor may comprise a substantially transparent outer tube and said tension member may comprise at least one rod extending from said base to said cap structure, said rod adapted to act in tension to compress said evaporation reactor between said base and said cap structure.

In another embodiment, said means for liquid concentrate to exit said evaporation reactor may comprise at least one concentrate exit port in said base located within the area circumscribed by said evaporation reactor, each of said at least one concentrate exit port adapted to act as a passageway for liquid concentrate to exit said evaporation reactor. This embodiment may further include a liquid concentrate metering device, wherein said liquid concentrate exit port is hydraulically connected to said metering device to regulate concentrate flow from zero to a predetermined maximum flow rate.

In another embodiment, said means for feed liquid to enter said feed liquid region may comprise at least one feed liquid entry port in said base located within the area circumscribed by said evaporation reactor and at least one tubular extension fit to each of said at least one feed liquid entry port on an upper surface of said base, wherein said extension terminates in said feed liquid region, and whereby such arrangement allows the feed liquid to remain substantially separated from the liquid concentrate. This embodiment may further include a feed liquid tank, wherein said feed liquid entry port is hydraulically connected to said feed liquid tank, said feed liquid tank located such that a predetermined liquid surface operating level is maintained within said tubular evaporation reactor by gravity flow.

In another embodiment said means for vapor to exit comprises a vapor exit port in said cap structure and a vapor conduit fit to said cap structure.

In another embodiment, said means for vapor to exit comprises a vapor exit port in said base and a vapor conduit fit to said base, said vapor conduit extending upwards to a point above the liquid surface inside said evaporation reactor.

Other embodiments of the present invention provide for methods of creating distilled liquid from contaminated liquids using solar radiation. In one embodiment, the method comprises providing a machine of the type comprising a substantially vertical, tubular evaporation reactor adapted to provide a liquid concentrate region below a feed liquid region, a base located at a lower end of said evaporation reactor, a cap structure located at an upper end of said evaporation reactor, a means for feed liquid to enter said evaporation reactor in said feed liquid region, a means for liquid concentrate to exit said evaporation reactor from said liquid concentrate region, a means for vapor to exit said evaporation reactor, at least one tension member that connects said base to said cap structure and acts to compress said evaporation reactor between said base and said cap structure, thereby creating substantially watertight seals between said base, said evaporation reactor, and said cap structure; providing at least one solar reflector device located congruently with said evaporation reactor so as to direct reflected solar radiation to a point or line coincident with said evaporation reactor; introducing feed liquid into said evaporation reactor; and drawing off distillate. This method may further comprise recovering, with a suitable heat exchanger, heat lost through condensation of said vapor and/or heat transported with the concentrate, and using said recovered heat to preheat feed liquid.

Other embodiments of the present invention provide a machine for evaporating liquids, comprising a substantially vertical, tubular evaporation reactor adapted to provide a liquid concentrate region below a feed liquid region, a base located at a lower end of said evaporation reactor, a cap structure located at an upper end of said evaporation reactor, at least one feed liquid opening in said base located within the area circumscribed by said evaporation reactor and at least one tubular extension fit to each of said at least one feed liquid opening on an upper surface of said base, wherein said extension terminates in said feed liquid region, and whereby such arrangement allows the feed liquid to remain substantially separated from the liquid concentrate, at least one concentrate opening in said base located within the area circumscribed by said evaporation reactor, each said concentrate opening adapted to act as a passageway for liquid concentrate to exit said evaporation reactor, at least one vapor opening in said cap structure, in said base, or both and at least one vapor conduit hydraulically connected to said opening, and at least one tension member that connects said base to said cap structure and which is adapted to compress said evaporation reactor between said base and said cap structure, thereby creating substantially watertight seals between said base, said evaporation reactor, and said cap structure.

The machine may further include at least one solar reflector device located in relation to said evaporation reactor so as to direct reflected solar radiation to a point or line coincident with said evaporation reactor.

In another embodiment, said evaporation reactor may comprise an outer tube and an inner tube of smaller outside dimension relative to said outer tube located concentrically within said outer tube, whereby said outer tube and said inner tube form a longitudinal annulus adapted for a feed liquid to react with solar radiation. Said outer tube may be substantially transparent, further including small diameter wire embedded within and/or affixed to the surface of said outer tube. In another embodiment, said inner tube and/or said outer tube may be tinted blue-green to resemble the color of water in the ocean.

In another embodiment, said tension member may comprise at least one rod, affixed to and extending from said base to said cap structure, said rod affixed to said cap structure, said rod adapted to be put in tension whereby said evaporation reactor is in compression.

In another embodiment said tension member may comprise at least one flexible, elastic member secured to said base and to said cap structure, said elastic member adapted to act in tension to compress said evaporation reactor between said base and said cap structure.

In another embodiment, said evaporation reactor may comprise a substantially transparent outer tube and said tension member may comprise at least one rod extending from said base to said cap structure, said rod adapted to act in tension to compress said evaporation reactor between said base and said cap structure.

Another embodiment may further include a liquid concentrate metering device, wherein said liquid concentrate opening is hydraulically connected to said metering device to regulate concentrate flow from zero to a predetermined maximum flow rate.

Another embodiment may further include a feed liquid tank, wherein said feed liquid opening is hydraulically connected to said feed liquid tank, said feed liquid tank located such that a predetermined liquid surface operating level is maintained within said tubular evaporation reactor by gravity flow.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

Exemplary embodiments are illustrated in the referenced figures. It is intended that the embodiments and figures disclosed herein are to be considered illustrative rather than restrictive.

DETAILED DESCRIPTION OF THE INVENTION

Figure 1:
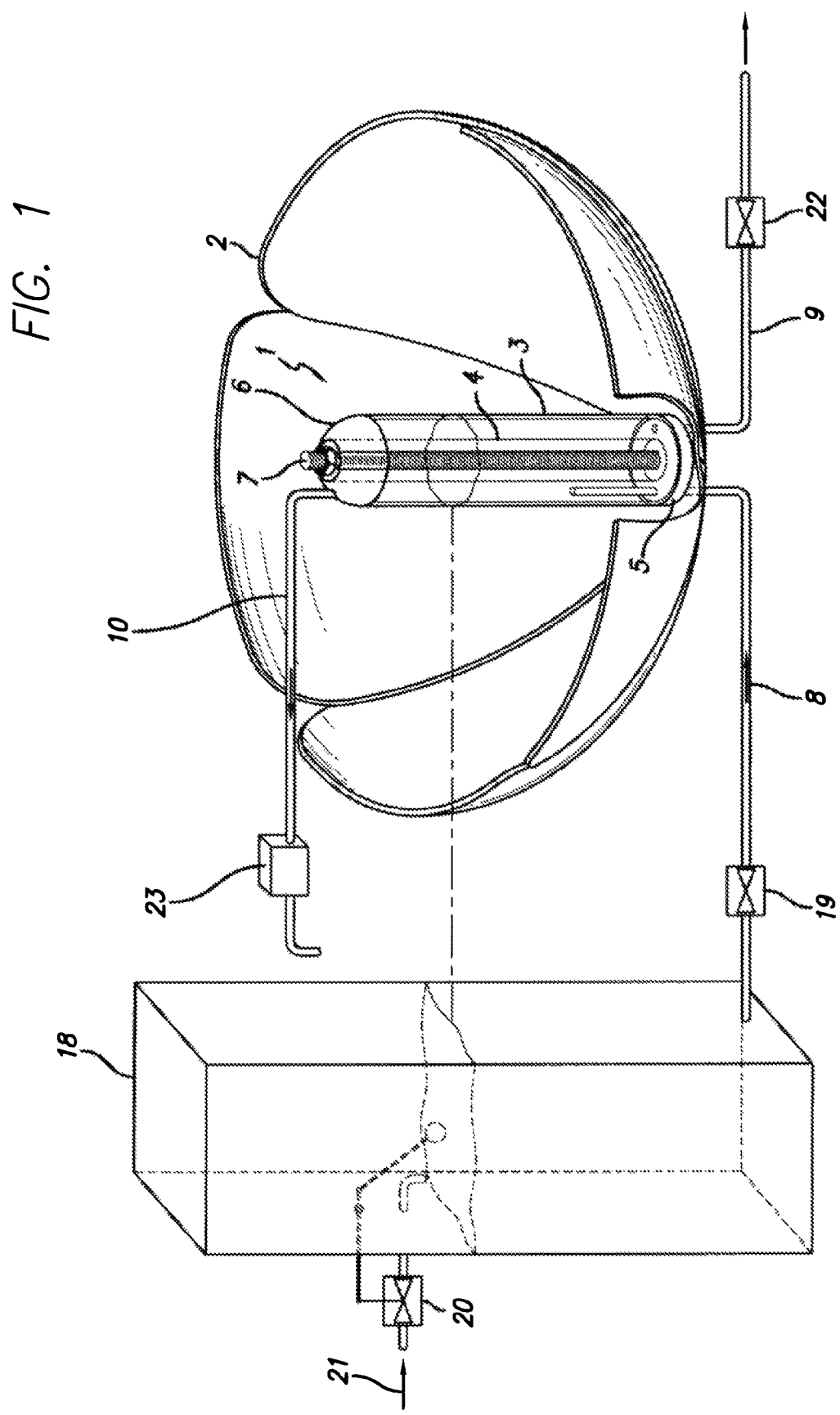
FIG. 1 is an isometric view showing a reactor and reflector system sized for individual or family use in accordance with an embodiment of the present invention.

All references cited herein are incorporated by reference in their entirety as though fully set forth. Unless defined otherwise, technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Indeed, the present invention is in no way limited to the methods and materials described.

The invention is designed to use direct and/or reflected solar radiation to heat liquid until it evaporates, producing low pressure vapor. The general arrangement consists of a tubular, substantially vertical reactor in which a column of liquid is heated by the sun's direct or reflected energy. The phrase "substantially vertical" is defined as the allowable deviation from vertically plumb, established through routine experimentation for each embodiment of the invention, that will create the desired liquid feed and liquid concentrate regions within the reactor as described more fully below. The reactor has a cap structure and a base. A tension member creates a substantially watertight reactor assembly by putting the reactor tube into compression between the cap and the base.

As the liquid is heated, vapor is driven off at the top of the water column. A conduit conveys the vapor out of the reactor column where it can then be condensed to form distilled liquid. Inside the reactor, the liquid left behind, termed concentrate throughout this document, is more dense than the incoming feed liquid because it contains material left behind by the evaporated liquid. The material may include mineral salts, organics, suspended solids, particulates, or other compositions that do not travel with the vapor. The concentrate tends to settle by gravity to the lower portions of the reactor. This area is termed the liquid concentrate region of the reactor. The region extends up from the base a distance that may be determined by routine experimentation based on a given reactor size, a given feed liquid, and a given desired contaminant level in the concentrate. Concentrate may exit the reactor through openings in the base.

The feed liquid may be introduced into the liquid column inside the reactor at a point above the liquid concentrate region. The feed liquid can flow through additional openings in the base and up into tubes or pipes that extend above the base surface. By this arrangement, mixing between the exiting concentrate and incoming feed liquid is substantially reduced. The area where the feed liquid enters the liquid column inside the reactor is termed the feed liquid region.

Low pressure vapor from the reactor is conveyed to a condenser where it returns to a liquid state. This liquid distillate may be suitable for consumption, further treatment, or disposal, depending on the feed liquid.

The concentrate may be conveyed from the reactor for treatment, disposal or other uses depending on the feed liquid. In some uses, creating the concentrate may be the primary function of the device, for example, if the device is used to thicken the feed liquid or to drive off volatile components of the feed liquid. Thus, the device may be useful in applications such as stripping volatile organic compounds or petroleum contaminants.

The reader will note that the invention described above operates with no moving parts, and no membrane or partition is required to separate the liquid concentrate region from the feed liquid region.

With the addition of an adjustable valve to regulate the flow of concentrate, the system can operate continuously in accordance with available sunlight, feed liquid characteristics, geographical location, desired concentrate density, and other factors that may impact performance.

The feed liquid would be conveyed from a source that incorporates an arrangement or mechanism to maintain a constant liquid level inside the reactor. This level could vary with the factors described above, but may allow for a vapor space in the reactor above the liquid column to occupy from zero percent to sixty percent of the total reactor length. The mechanism to maintain a constant level could be an elevated tank and gravity flow, or a level sensing instrument and control valve, or other common control elements.

A small system could operate without electric motors or controls. Such a system may consist of a manual throttling valve, an elevated tank of feed liquid, and a simple coiled tube for condensing the vapor. Once positioned properly, such a system would operate with only human-powered control, such as adjusting the concentrate regulating valve, filling the feed tank and/or the reactor, and positioning the reactor. Conversely, the system could be made more complex to include features such as a moving reflector with a sun tracking device, motorized inlet and outlet valves, and instrumentation to control the outlet valve based on contaminant levels in the concentrate. Photovoltaic panels and batteries could eliminate or reduce such a system's dependence on grid power. The invention is scalable both in individual reactor size and in number of reactor units. In a large scale application, the reactor tower could be many feet tall, and an array of multiple reflectors would be used to direct solar radiation to the tower.

EXAMPLE 1

In a first exemplary embodiment, as shown in FIG. 1, the solar distillation device consists of evaporation reactor 1 centered in parabolic reflective dish 2, feed tank 18, condenser 23, and various connecting pipes or conduits described further below. The components of evaporation reactor 1 include outer cylinder 3, inner cylinder 4 located concentrically to outer cylinder 3, base 5, cap structure 6, and threaded rod 7. Outer cylinder 3 may be constructed of thin-walled glass. Inner cylinder 4 may also be constructed of glass, and in this embodiment is thicker walled. In various embodiments, the outer cylinder's wall thickness could be three-eighths (⅜) of an inch, and the outside diameter could be twelve (12) inches. The inner cylinder's wall thickness could be three (3) inches, and the outside diameter could be eight (8) inches. The cylinders could be approximately seven (7) feet tall in such an embodiment.

The annular space between outer cylinder 3 and inner cylinder 4 creates a hollow, cylindrical volume wherein the liquid is heated. Base 5 seals the bottom of the reactor, and cap structure 6 seals the top of the unit. In this embodiment, the base and cap are constructed of a non-corrosive or suitably coated metallic material, but other materials, such as plastics, ceramics, or glass could also be used. In this embodiment, the cap is dome-shaped and the base is a flat plate, but the shapes of both can be varied. A tension member, in this case threaded rod 7, extends longitudinally from base 5 to cap structure 6, through the center of inner cylinder 4, and ties the reactor assembly together. In this embodiment, the threaded rod may be one (1) inch nominal outside diameter and constructed of stainless steel. This arrangement creates a strong, easily manufactured reactor assembly that is substantially watertight.

Figure 2:
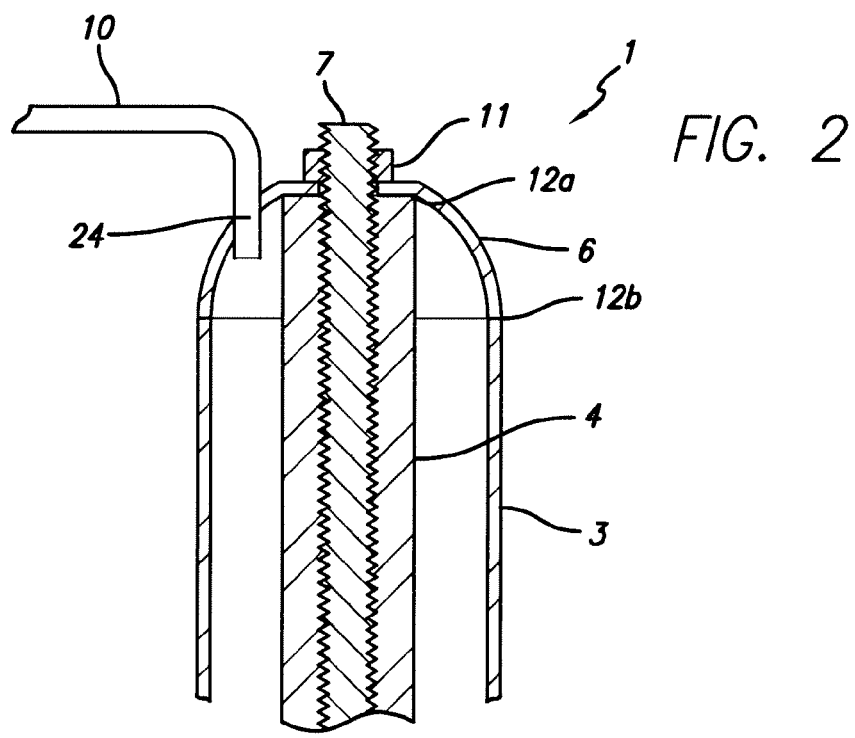
FIG. 2 is a detailed section view of a connection between the cap structure, tension member, and tubular reactor in accordance with an embodiment of the invention.

FIG. 2, a detail enlargement of FIG. 1, shows threaded rod 7, tensioning nut 11, cap structure 6, outer cylinder 3, and inner cylinder 4 in section view. When tensioning nut 11 is tightened against cap structure 6, threaded rod 7 pulls base 5 and cap structure 6 against the ends of reactor cylinders. Depending on the materials used for the reactor components, optional top sealing gaskets 12a and 12b may be needed to create a substantially watertight seal between the cylinders and the cap structure. One skilled in the art will recognize that the threaded rod can be placed in tension by methods other than a tensioning nut, and indeed, the threaded rod may be replaced by other structures capable of acting in tension. Cap structure 6 is shown with vapor opening 24, to which vapor conduit 10 is attached. Vapor conduit 10 connects to condenser 23, as shown in FIG. 1.

Figure 3:
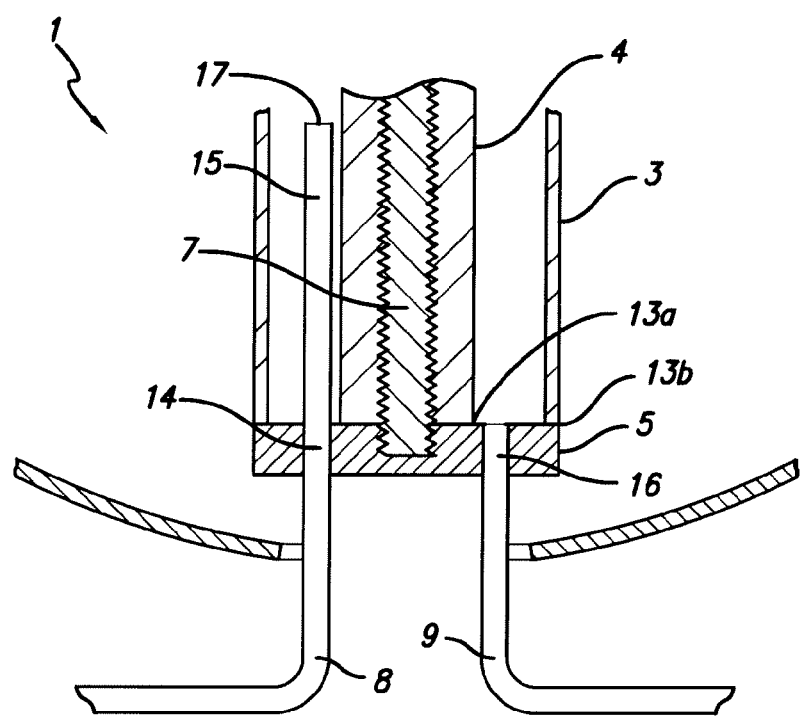
FIG. 3 is a detailed section view of a connection between the base, tension member, and tubular reactor in accordance with an embodiment of the invention.

FIG. 3, also a detail enlargement of FIG. 1, shows base 5, threaded rod 7, outer cylinder 3, and inner cylinder 4 in greater detail. Depending on the materials used for the reactor components, optional bottom sealing gaskets 13a and 13b may be used to create a substantially watertight seal between the cylinders and the base structure.

As also shown in FIG. 3, base 5 is equipped with feed liquid openings 14, feed liquid extensions 15, and concentrate openings 16. Feed liquid extensions 15 extend up from the base, terminating at inlet feed point 17 located in the feed liquid region of the reactor's liquid column. In this embodiment, the feed liquid region could consist of the upper thirty (30) to eighty (80) percent of the liquid column depth, while the liquid concentrate region could consist of the lower twenty (20) to seventy (70) percent of the liquid column depth.

Referring again to FIG. 1, base 5 is attached to feed pipe 8 that also connects to feed tank 18. Feed pipe 8 may be equipped with optional valve 19 that serves to control feed liquid flow from feed tank 18 to reactor 1. In this embodiment, feed tank 18 is equipped with float valve 20 that regulates flow from the feed source 21.

Base 5 is also attached to concentrate conduit 9. Concentrate conduit 9 is connected to concentrate throttling valve 22 that controls the concentrate flow rate.

In a simple, manual mode of operation, reflective dish 2 is positioned so as to take fullest advantage of the sun's rays. Feed source 21 is connected to feed tank 18, and brackish water, sea water, or other contaminated liquid (collectively, feed liquid) enters the feed liquid region of the annular reactor space through feed liquid openings 14 and extensions 15 in base 5. Concentrate throttling valve 22 is closed initially.

Sunlight reflected from reflective dish 2 heats the liquid column in the reactor. As the liquid column is heated and begins to evaporate, low pressure vapor collects at the top of the reactor under cap 6 and is conducted away from the reactor via vapor conduit 10. The low pressure vapor is returned to liquid distillate in any suitable, commercially available condenser 23. In small units, the condenser may be omitted, because the vapor conduit would be long enough to condense the vapor within its length. Heat rejected by the condensation of vapor to liquid can be recovered in the feed water through the use of a suitable condensing heat exchanger.

The liquid left behind in the reactor after partial evaporation (the concentrate) has a higher concentration of dissolved salts, solids, or other contaminants than the incoming feed liquid, and thus is more dense than the incoming feed liquid. The concentrate settles by gravity to the liquid concentrate region near the surface of base 5. After evaporation starts, concentrate valve 22 is opened and adjusted so that liquid concentrate leaves the reactor through concentrate openings 16 at a rate sufficient to optimize vapor generation but minimize scale buildup. Concentrate conduit 9 conveys the concentrate away from the reactor for further processing or disposal. In alternate embodiments, the concentrate heat can be recovered through the use of a suitable, commercially available heat exchanger. The heat can be transferred to the feed liquid to improve thermal efficiency of the system or used for other purposes.

Feed liquid enters the reactor automatically (by gravity in this embodiment) as vapor is driven off and concentrate is released from the reactor column. Feed liquid is supplied from feed tank 18 which serves to maintain a constant liquid level in the reactor. Feed tank 18 is filled via float valve 20 which regulates inlet flow from the feed source 21. In alternate embodiments, the feed tank may be equipped with a tank heater wherein heat can be transferred from distillate or concentrate to the liquid pool.

EXAMPLE 2

Figure 4:
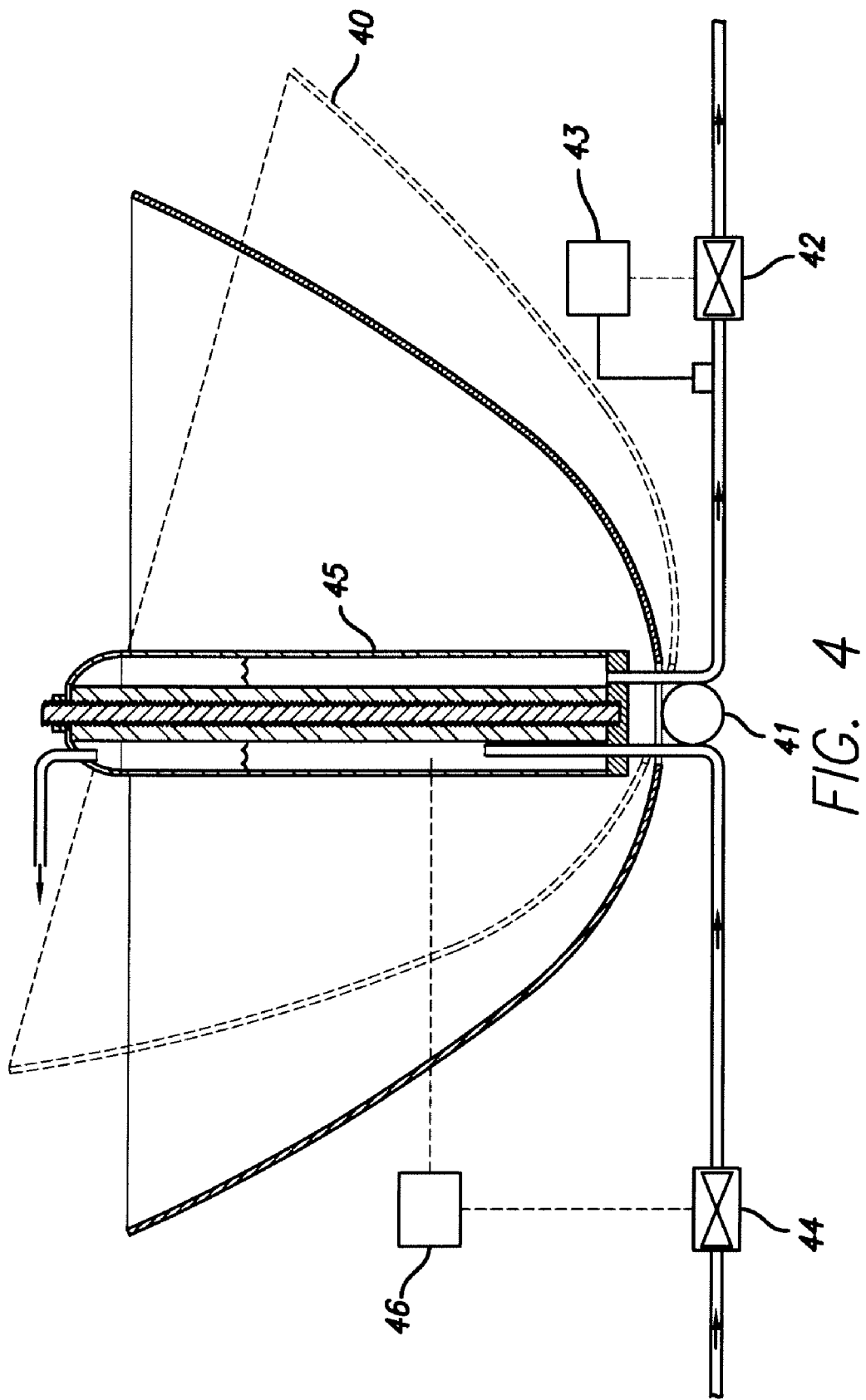
FIG. 4 is a section view of an automated system in accordance with an embodiment of the invention.

FIG. 4 shows an example of the solar distillation device using the same basic concept of the evaporation reactor, but utilizing auxiliary equipment such as a moving reflector 40 with a drive mechanism 41 used to drive the reflector and track the sun's path across the sky. In FIG. 4, the concentrate valve 42 is automated. Based on operating data, an optimum concentrate flow can be generated by routine experimentation, and concentrate valve 42 can be modulated automatically in accordance with the contaminant concentration. Instrument 43 is used to measure the concentrate contaminate level through resistance, density, particle count, or other methodology as readily appreciated by someone skilled in the art.

Additionally, FIG. 4 shows automated feed valve 44, whereby the liquid level in reactor 45 is maintained by modulating feed valve 44, such modulations being based on level controller 46 output. Level controller 46 is any suitable instrument that monitors liquid level based on an ultrasonic signal, pressure signal, electro-resistance or other methodology. In this embodiment, feed tank 18 of FIG. 1 is replaced by any suitably pressurized feed source. Through such additions to the basic device of FIG. 1, the distillation system can be made to operate automatically for extended periods without human interaction after initial startup.

EXAMPLE 3

Figure 5:
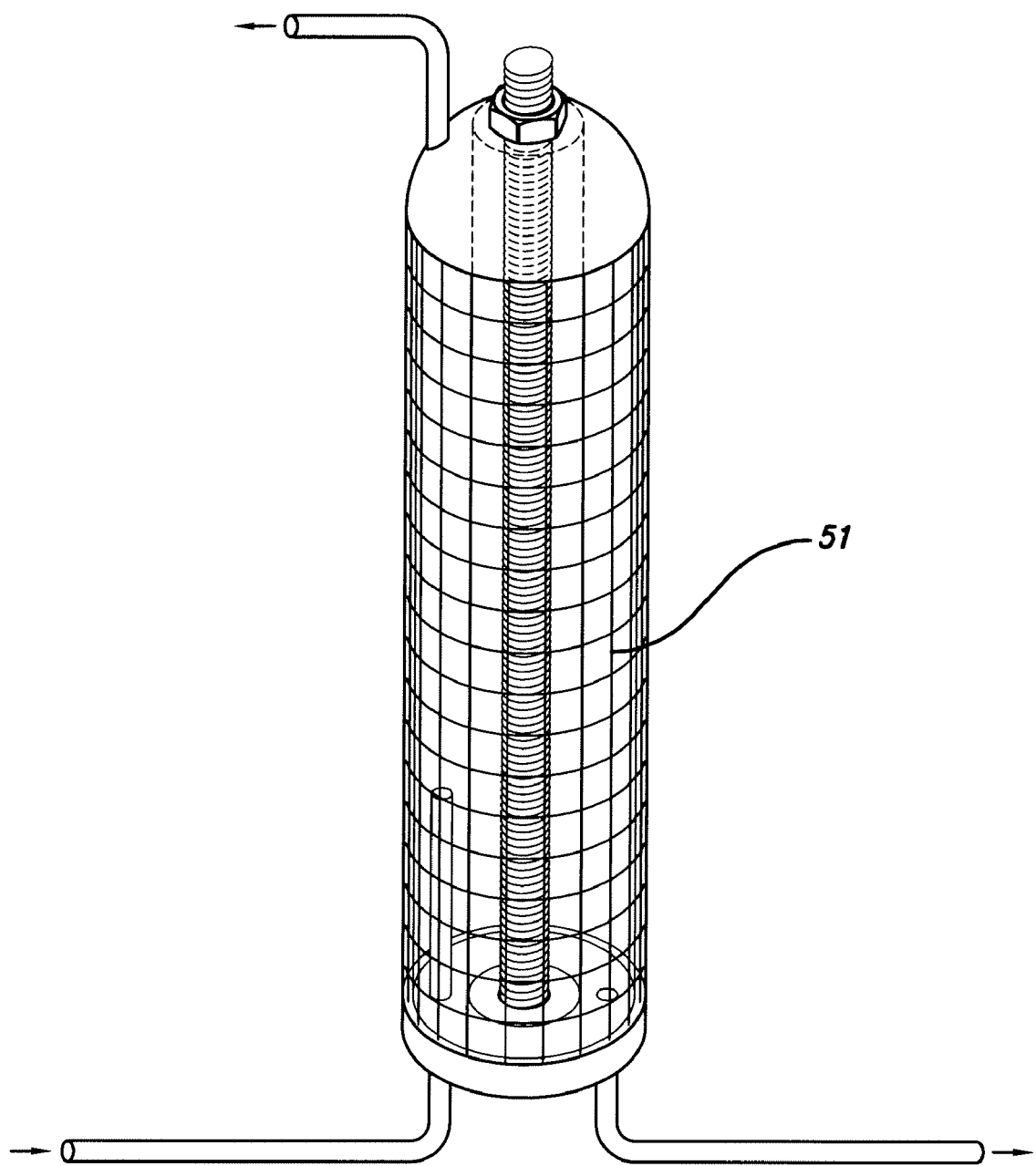
FIG. 5 is an isometric view of an outer cylinder with embedded wires in accordance with an embodiment of the invention.

FIG. 5 shows an embodiment utilizing a glass outer cylinder that includes metal wire 51 embedded within or affixed to the glass similar to shatterproof or security glass. The wire embedded in the outside cylinder can be arranged to act as an electric heating element to maintaining the water column temperature overnight, during overcast periods, or at other periods when auxiliary heating is advantageous.

EXAMPLE 4

Figure 6:
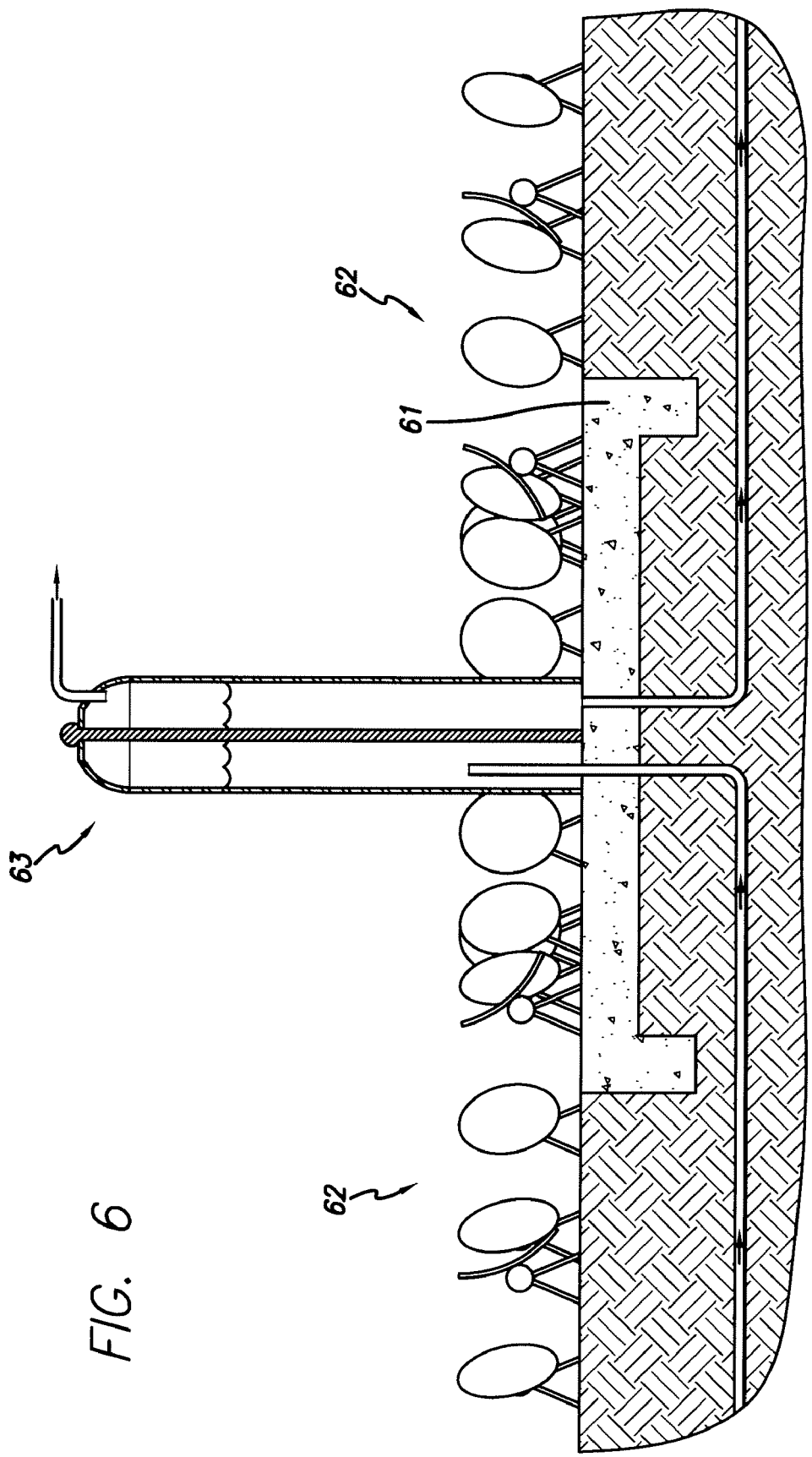
FIG. 6 shows an elevation of a large-scale system utilizing an array of reflectors and components sized for greater production volumes in accordance with an embodiment of the invention.

FIG. 6 shows an embodiment on a larger scale, where base 5 of FIG. 1 has been replaced by a constructed base deck 61 that may be made, for example, of cast-in-place or precast concrete, and the reflective dish 2 of FIG. 1 has been replaced by the array 62 of multiple reflectors, each focusing its rays on the central evaporation reactor 63. The reactor functions and is constructed on the same principle as the smaller unit of the first embodiment, but the size of the system components would be scaled accordingly.

EXAMPLE 5

Figure 7:
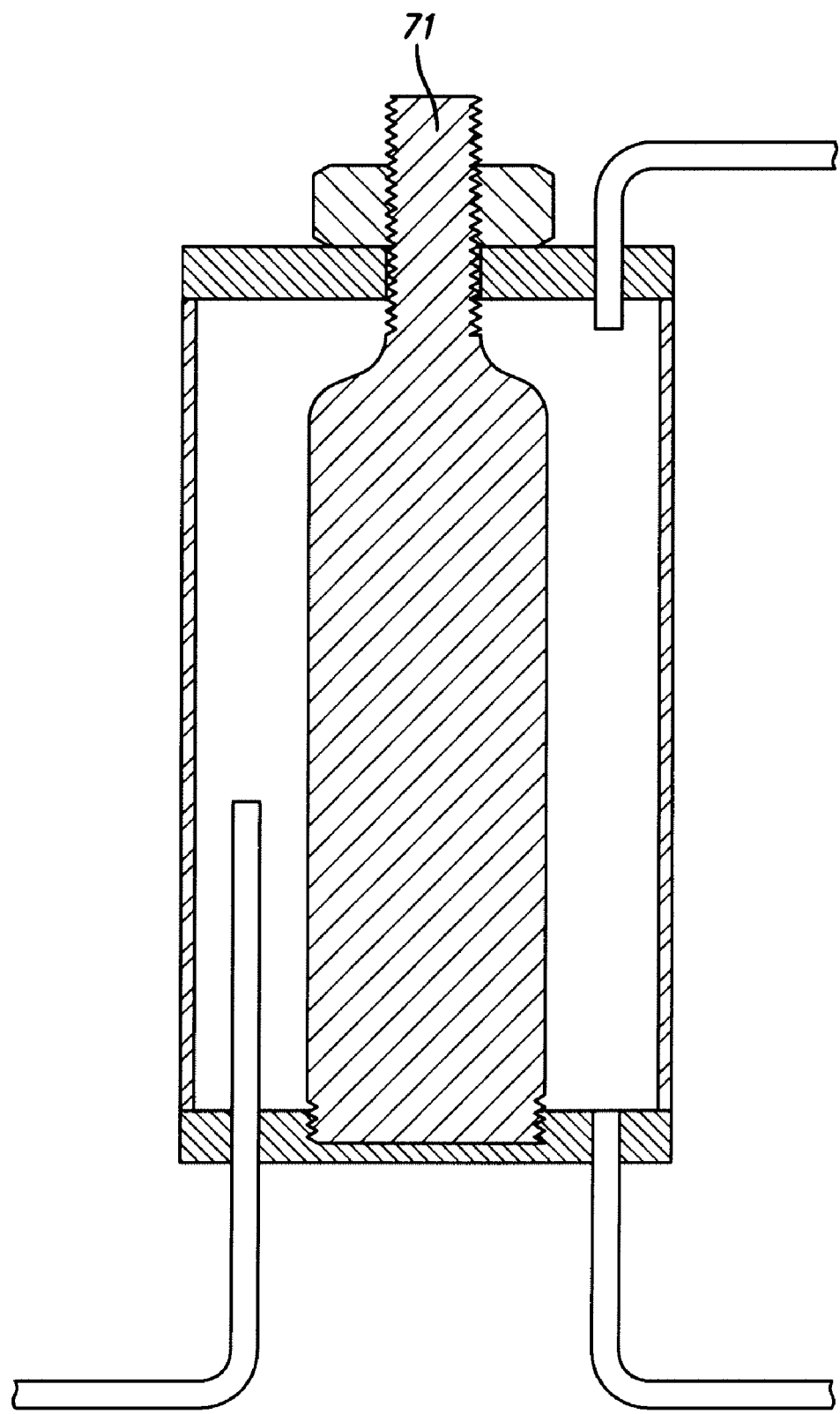
FIG. 7 is a section view of an alternate reactor construction method omitting the separate inner cylinder in accordance with an embodiment of the invention.

FIG. 7 shows an embodiment wherein inner cylinder 4 of FIG. 1 has been eliminated. In lieu of the inner cylinder, threaded rod 7 of FIG. 1 has been modified to tension member 71 of this FIG. 7 that provides an appropriately sized annular space for the liquid column in the evaporation reactor. Tension member 71 functions similarly to threaded rod 7, but would require machining or special fabrication as compared to the embodiment of FIG. 1.

EXAMPLE 6

Figure 8A:
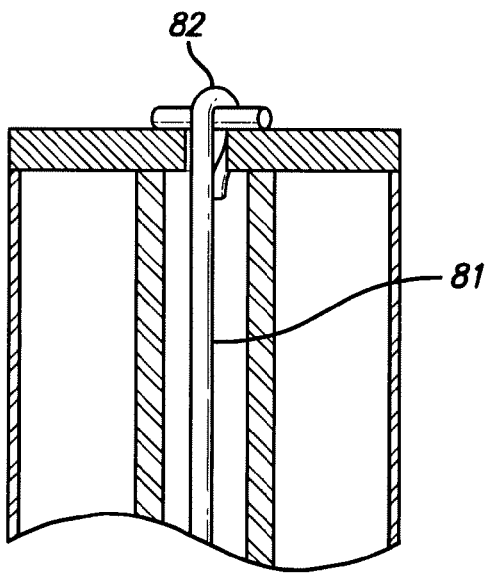
FIGS. 8A, 8B and 8C are detail views of an alternate, elastic tension member in accordance with an embodiment of the invention.
Figure 8B:
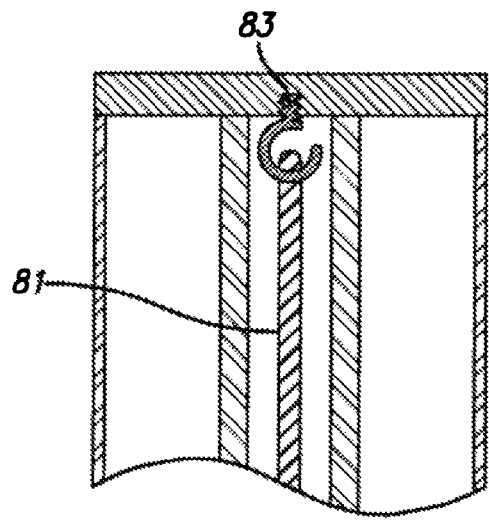
Figure 8C:
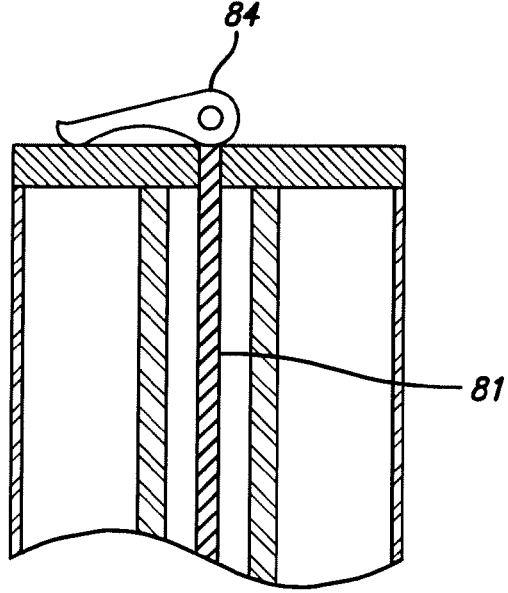

FIGS. 8A, 8B, and 8C show an alternative tension cord 81, where in lieu of a threaded rod, a flexible, elastic material (such as rubber tubing, shock cord or "bungee" cord) is used as the tensioning member. The figures show various methods for applying tension to tension cord 81, including a pin-and-loop arrangement 82, a hook and thimble 83, and a snap-over cam 84.

EXAMPLE 7

Figure 9:
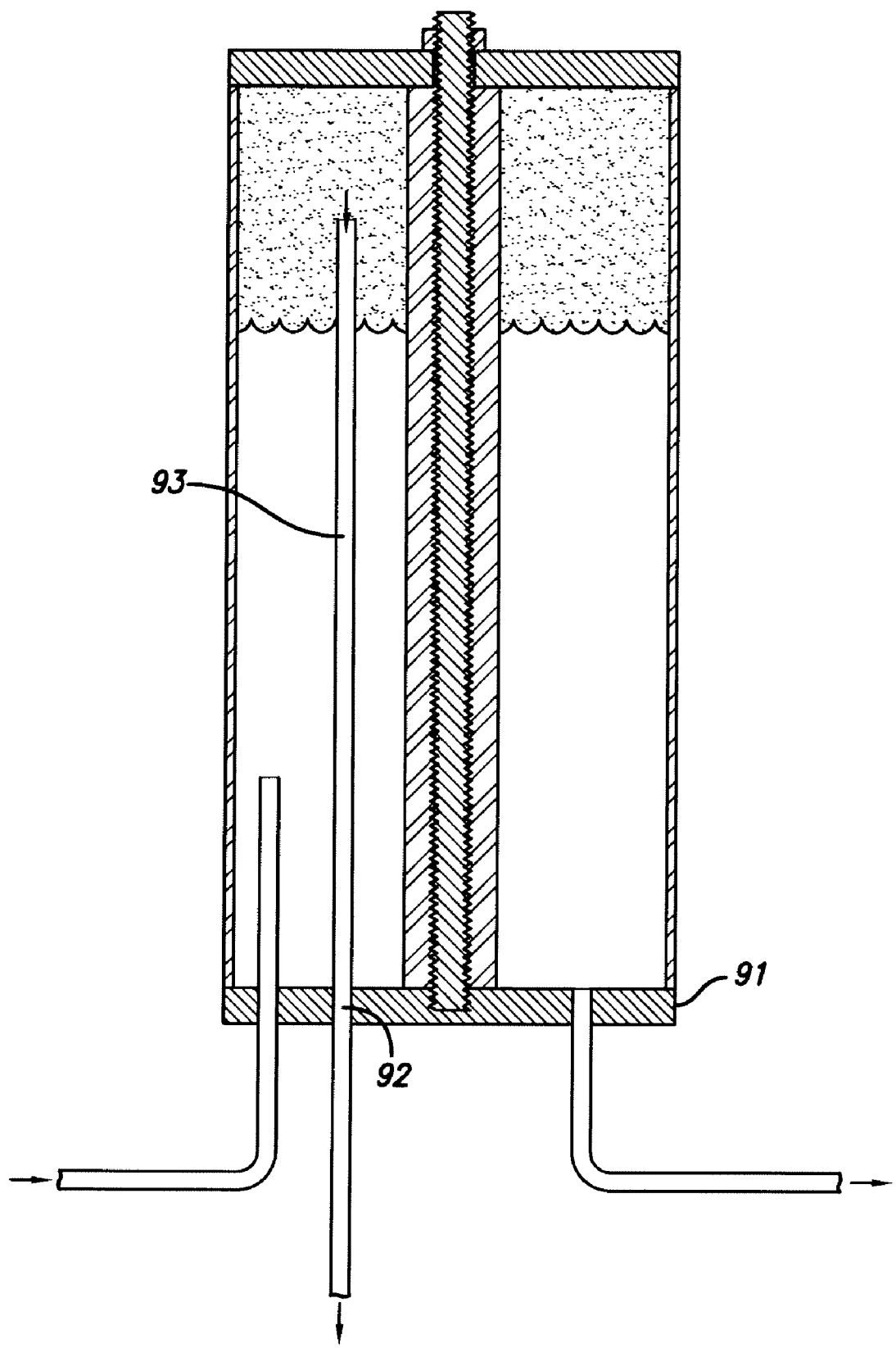
FIG. 9 shows an alternate reactor where vapor exits the reactor through the base rather than the cap structure in accordance with an embodiment of the invention.

FIG. 9 shows an alternative reactor arrangement where the vapor exits the reactor via vapor openings 92 in base 91. Vapor extension 93 is fit to base 91 and extends to a point above the liquid surface inside the reactor. Such arrangement would eliminate the vapor openings 24 in cap structure 6 shown in FIG. 1.

EXAMPLE 8

Figure 10:
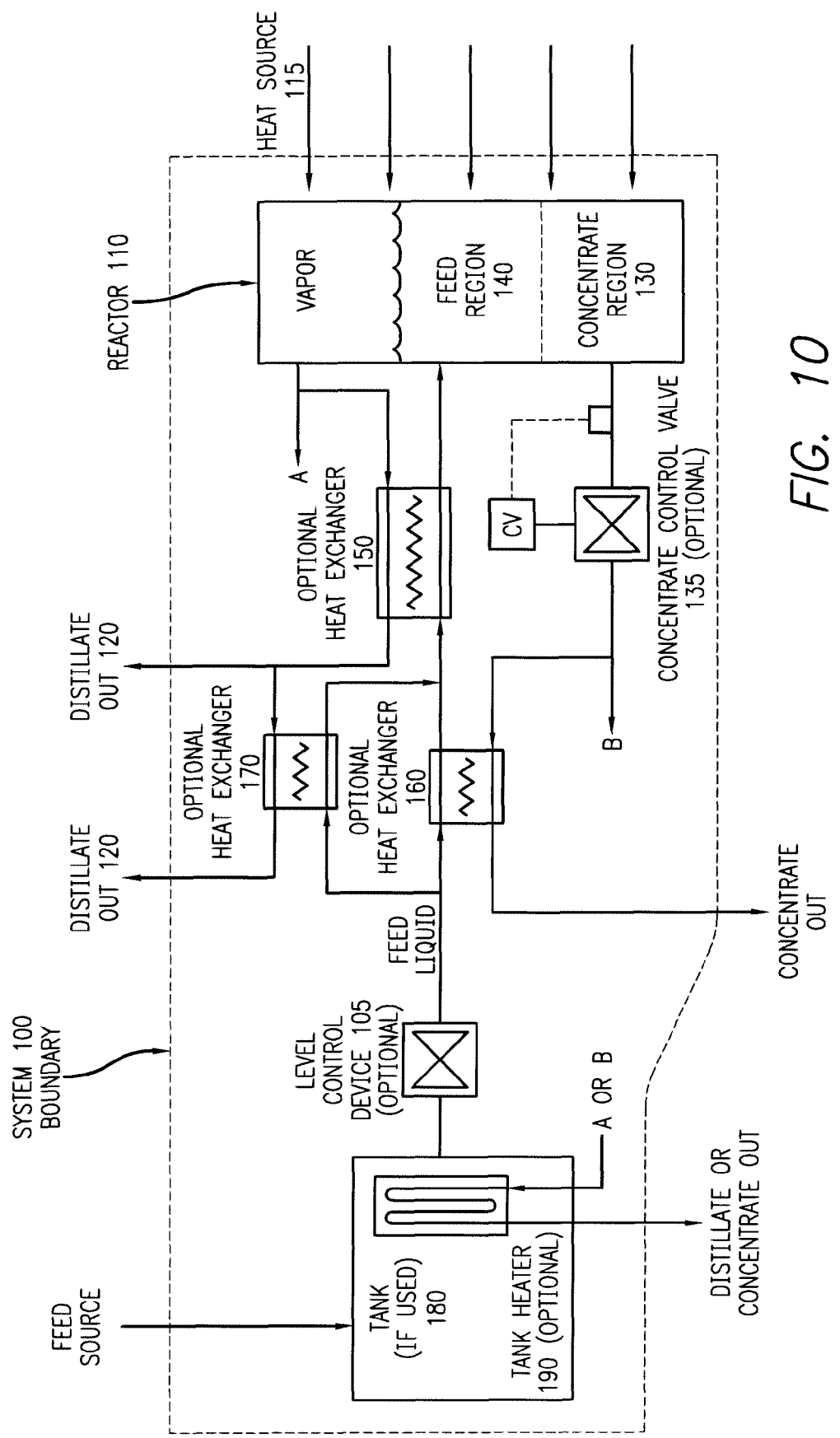
FIG. 10 is a system schematic and flow diagram, in accordance with an embodiment of the invention.

FIG. 10 shows a flow diagram of the process as well as optional components that could be incorporated to the basic processes described above to improve thermal efficiency of the system. These components could include a feed liquid/liquid concentrate heat exchanger, a feed tank heater, a feed liquid/vapor condensing heat exchanger, or a feed liquid/distillate heat exchanger. Feed liquid is introduced to system 100. Level control device 105 allows feed liquid to enter reactor 110 only as needed to maintain a nearly constant operating level. Feed liquid enters the feed liquid region 140 within reactor 110 and is heated by heat source 115. Feed liquid partially evaporates. Vapor exits reactor 110 and is condensed back to liquid distillate 120. Liquid distillate 120 exits system 100 for further use, treatment, or disposal. Concentrate settles towards bottom of reactor, creating liquid concentrate region 130. Concentrate control valve 135 regulates liquid concentrate flow out of the reactor. Concentrate exits reactor 110 through concentrate control valve 135. Concentrate exits system 100 for further treatment, disposal, or other uses. Vapor/feed liquid condensing heat exchanger 150 may be used to transfer heat of condensation from vapor to feed liquid. The distillate can also be routed through distillate/feed liquid heat exchanger 170 for further heat transfer. Similarly, liquid concentrate/feed liquid heat exchanger 160 may be used to transfer heat from exiting concentrate to incoming feed liquid. Finally, concentrate or distillate could be routed through feed tank heater 190 which would transfer heat into the liquid pool inside tank 180. Such additional heat exchangers function to increase the thermal efficiency of the system.

At least one embodiment of the solar distillation device provides an efficient, easily manufactured device that can operate for extended periods with little or no human intervention. Because the basic design of the reactor works in small and large scales, variations of the device can be built for a wide range of production flows. In addition, by utilizing multiple reactors, systems can be built which provide both increased production capability and redundancy.

While the above description contains many specific details, these should not be construed as limitations on the scope of the invention, but rather as exemplaries of several preferred embodiments. Many variations of the reactor design are possible, but have been omitted from the drawings as less important to the function of the device.

For example, the reactor tube could be transparent or opaque, and could be tinted various shades of blue, blue-green, or green to take on the color of the ocean, thereby potentially increasing the efficiency of the device.

Additionally, the reactor tube cross-section can be of any shape in addition to cylindrical, for example rectangular, triangular, oval, or polygonal. Furthermore, besides glass, the reactor tubes can be of any material of sufficient strength and transparency and suitable thermal properties, for example, polycarbonate, Pyrex®, or other materials. In addition, transparent reactor tubes could be replaced by a thin-shelled, metallic tube tinted a dark color to take advantage of direct thermal heating.

The tension member connections to either or both the base and the cap structure can be made with other means besides a tensioning nut on threads, including but not limited to elastic fabric, rubber or shock cord connections, internal threads on the cap and/or base plate and or tension rod itself, magnetic or electromagnetic connections, turnbuckles, wedges, cams, or other means of applying tension to the tension rod and compressing the outer cylinder.

Accordingly, the scope of the invention should be determined not by the embodiments illustrated, but by the appended claims and their legal equivalents.

What is claimed is:

1. A method for creating distilled liquid from contaminated liquids using solar radiation, comprising:
    (a) providing a machine comprising:
        (i) a substantially vertical, tubular evaporation apparatus to provide a liquid concentrate region below a feed liquid region, wherein said evaporation apparatus comprises an outer tube and an inner tube of smaller outside dimension relative to said outer tube located concentrically within said outer tube, whereby said outer tube and said inner tube form a longitudinal annulus for feed liquid to react with solar radiation, and wherein said outer tube is substantially transparent and comprises wire embedded within and/or affixed to the surface of said outer tube,
        (ii) a base located at a lower end of said evaporation apparatus,
        (iii) a cap structure located at an upper end of said evaporation apparatus,
        (iv) a means for feed liquid to enter said feed liquid region within said evaporation apparatus,
        (v) a means for liquid concentrate to exit said evaporation apparatus from said liquid concentrate region,
        (vi) a means for vapor to exit said evaporation apparatus, and
        (vii) at least one tension member that connects said base to said cap structure, thereby creating substantially watertight seals at said base and said cap structure of said evaporation apparatus, and
    (b) providing at least one solar reflector device located in relation to said evaporation apparatus so as to direct reflected solar radiation to a point or line coincident with the outside of said evaporation apparatus,
    (c) introducing feed liquid into said evaporation apparatus, wherein the feed liquid enters the feed liquid region of the apparatus and is heated by the solar radiation, such that evaporation ensues and distillate is formed,
    (d) drawing off distillate formed by the evaporation process, and
    (e) draining the liquid concentrate from the liquid concentrate region.

2. The method of claim 1, further comprising:
    (a) recovering heat lost through condensation of said vapor and/or heat transported with the concentrate, and
    (b) using said recovered heat to preheat the feed liquid.

3. A machine for evaporating liquids, comprising:
    (a) a substantially vertical, tubular evaporation apparatus to provide a liquid concentrate region below a feed liquid region, wherein said evaporation apparatus comprises an outer tube and an inner tube of smaller outside dimension relative to said outer tube located concentrically within said outer tube, whereby said outer tube and said inner tube form a longitudinal annulus for a feed liquid to react with solar radiation, and wherein said outer tube is substantially transparent and further comprises wire embedded within and/or affixed to the surface of said outer tube,
    (b) a base located at a lower end of said evaporation apparatus,
    (c) a cap structure located at an upper end of said evaporation apparatus,
    (d) a means for feed liquid to enter said feed liquid region within said evaporation apparatus,
    (e) a means for liquid concentrate to exit said evaporation apparatus from said liquid concentrate region,
    (f) a means for vapor to exit said evaporation apparatus,
    (g) at least one tension member that connects said base to said cap structure, thereby creating substantially watertight seals at said base and said cap structure of said evaporation apparatus, and
    (h) at least one solar reflector device located in relation to said evaporation apparatus so as to direct reflected solar radiation to a point or line coincident with the outside of said evaporation apparatus.

4. A machine for evaporating liquids, comprising:
    (a) a substantially vertical, tubular evaporation apparatus to provide a liquid concentrate region below a feed liquid region, wherein said evaporation apparatus comprises an outer tube and an inner tube of smaller outside dimension relative to said outer tube located concentrically within said outer tube, whereby said outer tube and said inner tube form a longitudinal annulus for a feed liquid to react with solar radiation; wherein said outer tube comprises wire embedded within and/or affixed to the surface of said outer tube, and wherein said inner tube and/or said outer tube is tinted blue-green to resemble the color of water in the ocean,
    (b) a base located at a lower end of said evaporation apparatus,
    (c) a cap structure located at an upper end of said evaporation apparatus,
    (d) a means for feed liquid to enter said feed liquid region within said evaporation apparatus,
    (e) a means for liquid concentrate to exit said evaporation reactor from said liquid concentrate region,
    (f) a means for vapor to exit said evaporation apparatus,
    (g) at least one tension member that connects said base to said cap structure, thereby creating substantially watertight seals at said base and said cap structure of said evaporation apparatus, and
    (h) at least one solar reflector device located in relation to said evaporation apparatus so as to direct reflected solar radiation to a point or line coincident with the outside of said evaporation apparatus.

5. A machine for evaporating liquids, comprising:
    (a) a substantially vertical, tubular evaporation apparatus to provide a liquid concentrate region below a feed liquid region, wherein said evaporation apparatus comprises an outer tube and an inner tube of smaller outside dimension relative to said outer tube located concentrically within said outer tube, whereby said outer tube and said inner tube form a longitudinal annulus for a feed liquid to react with solar radiation, and wherein said outer tube is substantially transparent, and further comprises wire embedded within and/or affixed to the surface of said outer tube,
    (b) a base located at a lower end of said evaporation apparatus,
    (c) a cap structure located at an upper end of said evaporation apparatus,
    (d) at least one feed liquid opening in said base located within the area circumscribed by said evaporation apparatus and at least one tubular extension fit to each of said at least one feed liquid opening on an upper surface of said base, wherein said extension terminates in said feed liquid region, and whereby such arrangement allows the feed liquid to remain substantially separated from the liquid concentrate, (e) at least one concentrate opening in said base located within the area circumscribed by said evaporation apparatus, said concentrate opening to act as a passageway for liquid concentrate to exit said evaporation apparatus, (f) at least one vapor opening in said cap structure, in said base, or both and at least one vapor conduit hydraulically connected to said vapor opening, (g) at least one tension member that connects said base to said cap structure, thereby creating substantially watertight seals at said base and said cap structure of said evaporation apparatus, and (h) at least one solar reflector device located in relation to said evaporation apparatus so as to direct reflected solar radiation to a point or line coincident with the outside of said evaporation apparatus.

6. A machine for evaporating liquids, comprising:

(a) a substantially vertical, tubular evaporation apparatus to provide a liquid concentrate region below a feed liquid region, wherein said evaporation apparatus comprises an outer tube and an inner tube of smaller outside dimension relative to said outer tube located concentrically within said outer tube, whereby said outer tube and said inner tube form a longitudinal annulus for a feed liquid to react with solar radiation, and wherein said outer tube comprises wire embedded within and/or affixed to the surface of said outer tube, and wherein said inner tube and/or said outer tube is tinted blue-green to resemble the color of water in the ocean, (b) a base located at a lower end of said evaporation apparatus, (c) a cap structure located at an upper end of said evaporation apparatus, (d) at least one feed liquid opening in said base located within the area circumscribed by said evaporation apparatus and at least one tubular extension fit to each of said at least one feed liquid opening on an upper surface of said base, wherein said extension terminates in said feed liquid region, and whereby such arrangement allows the feed liquid to remain substantially separated from the liquid concentrate, (e) at least one concentrate opening in said base located within the area circumscribed by said evaporation apparatus, said concentrate opening to act as a passageway for liquid concentrate to exit said evaporation apparatus, (f) at least one vapor opening in said cap structure, in said base, or both and at least one vapor conduit hydraulically connected to said vapor opening, (g) at least one tension member that connects said base to said cap structure, thereby creating substantially watertight seals at said base and said cap structure of said evaporation apparatus, and (h) at least one solar reflector device located in relation to said evaporation apparatus so as to direct reflected solar radiation to a point or line coincident with the outside of said evaporation apparatus.

* * * * *